United States Patent
Fischer et al.

(10) Patent No.: US 10,411,457 B2
(45) Date of Patent: Sep. 10, 2019

(54) POWER DISTRIBUTION SYSTEM FOR CONNECTION TO AN AC VOLTAGE NETWORK

(71) Applicant: Ellenberger & Poensgen GmbH, Altdorf (DE)

(72) Inventors: Erich Fischer, Altdorf (DE); Hubert Harrer, Hilpoltstein (DE); Thomas Regahl, Nuremberg (DE); Than-Huy Pham, Nuremberg (DE); Juergen Zeberl, Lauterhofen (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 16 days.

(21) Appl. No.: 15/729,074

(22) Filed: Oct. 10, 2017

(65) Prior Publication Data

US 2018/0034260 A1 Feb. 1, 2018

Related U.S. Application Data (63) Continuation of application No. PCT/EP2016/057101, filed on Mar. 31, 2016.

(30) Foreign Application Priority Data

Apr. 10, 2015 (DE) ........................ 10 2015 004 633

(51) Int. Cl.
*H02H 3/10* (2006.01)
*H02J 3/10* (2006.01)
(Continued)

(52) U.S. Cl.
CPC .............. *H02H 3/10* (2013.01); *H02H 3/006* (2013.01); *H02H 3/093* (2013.01); *H02H 7/26* (2013.01); *H02H 7/267* (2013.01); *H02J 3/10* (2013.01)

(58) Field of Classification Search
CPC .......... H02H 3/10; H02H 3/006; H02H 3/093; H02H 7/26; H02H 7/267; H02J 3/10
(Continued)

(56) References Cited

U.S. PATENT DOCUMENTS 3,714,452 A * 1/1973 Williamson ............ H02J 9/062
307/64
6,490,141 B2 * 12/2002 Fischer .................. H02H 3/087
361/18

(Continued)

FOREIGN PATENT DOCUMENTS

CN 2085979 U 10/1991
CN 101165988 A 4/2008
(Continued)

OTHER PUBLICATIONS

English translation of the International Search Report: PCT/EP2016/057101 dated Oct. 13, 2016.
(Continued)

*Primary Examiner* — Zeev V Kitov
(74) *Attorney, Agent, or Firm* — Muncy, Geissler, Olds & Lowe, P.C.

(57) ABSTRACT

A power distribution system for connection to an AC voltage network, having a UPS power supply unit for uninterruptible power supply with a network-side input and with at least one output to which a number of loads are connected or can be connected in parallel load circuits, wherein a protective device having an electromechanical tripping device, in particular a thermal/magnetic tripping device, and having an evaluation and tripping unit is connected in the or each load circuit, which tripping unit trips the tripping device on the basis of an electronic overload and/or short-circuit characteristic curve and on the basis of the output voltage from the UPS power supply unit.

19 Claims, 4 Drawing Sheets

(51) Int. Cl.
*H02H 3/00* (2006.01)
*H02H 3/093* (2006.01)
*H02H 7/26* (2006.01)

(58) Field of Classification Search
USPC ........................................................ 361/93.8
See application file for complete search history.

(56) References Cited

U.S. PATENT DOCUMENTS

| | | | |
|---|---|---|---|
| 7,800,877 | B2 | 9/2010 | Zeuch et al. |
| 7,989,977 | B2 | 8/2011 | Crane |
| 2002/0075620 | A1 | 6/2002 | Fischer et al. |
| 2005/0057869 | A1* | 3/2005 | Hale .................. H02H 1/0015 361/64 |
| 2011/0304942 | A1* | 12/2011 | Rozman .................. H02H 1/04 361/101 |
| 2016/0226235 | A1* | 8/2016 | Lathrop .................. H02H 3/08 |

FOREIGN PATENT DOCUMENTS

| | | |
|---|---|---|
| DE | 4033444 A1 | 4/1992 |
| DE | 29909206 U1 | 10/2000 |
| DE | 10 2004 046 810 A1 | 4/2006 |
| DE | 10 2006 042 768 A1 | 3/2007 |
| EP | 0419015 A2 | 3/1991 |
| EP | 0978920 A1 | 2/2000 |
| EP | 2811604 A1 | 12/2014 |
| JP | 2003-501991 A | 1/2003 |
| JP | 2007-20390 A | 1/2007 |
| JP | 2009-170338 A | 7/2009 |

OTHER PUBLICATIONS

English translation of the International Preliminary Report on Patentability and the Written Opinion of the International Searching Authority: PCT/EP2016/057101 dated Oct. 19, 2017.

* cited by examiner

POWER DISTRIBUTION SYSTEM FOR CONNECTION TO AN AC VOLTAGE NETWORK

This nonprovisional application is a continuation of International Application No. PCT/EP2016/057101, which was filed on Mar. 31, 2016, and which claims priority to German Patent Application No. 10 2015 004 633.0, which was filed in Germany on Apr. 10, 2015, and which are both herein incorporated by reference.

BACKGROUND OF THE INVENTION

Field of the Invention

The invention relates to a power distribution system for connection to an AC voltage network, having a power supply unit for uninterruptible power supply with a network-side input and at least one output to which a number of loads are or can be connected in parallel load circuits.

Description of the Background Art

A system or device for uninterruptible power supply (UPS), which is also referred to as a UPS power supply unit, is supported in network operation by the connected (public) AC voltage network (AC network). The loads connected to the UPS power supply unit are supplied either constantly by power electronic converters during converter operation or directly from the AC voltage network during a typically only short-time bypass operation. The converter operation occurs via a DC intermediate circuit which is connected downstream of a network-side AC-DC converter (rectifier) and upstream of a DC/AC converter (inverter) on the output or load side and in which buffer batteries or accumulators are connected.

If there is an interruption in the public AC voltage network, the UPS power supply unit switches to battery operation and is then supplied by the integrated buffer battery (buffer accumulator) for a limited period of time. Due to the electrical properties of the components integrated in the UPS power supply unit, the power which can be drawn during the battery operation of the UPS power supply unit and thus also the maximum current flowing are limited. Over staggered periods of up to several minutes, an appropriately staggered overcurrent, which can also typically be greater than 100% of the rated current of the connected load or of a connected device, can be drawn from the UPS power supply unit. A rated current in the case of electrical devices (loads) is understood to be the drawn electrical current strength when the device (load) is supplied with the rated voltage and outputs its rated power.

A higher overcurrent is allowed for shorter periods of time than for longer periods. According to standards, the time-limited maximum current (maximum load), by which the output voltage of the UPS power supply unit is maintained within the limits according to DIN EN 62040-3 (Section 5.3.4), is specified in data sheets of such UPS power supply units. A maximum current of 150% to 200% of the rated current during the time period of a few seconds to a few minutes is typical. However, a higher current can be drawn from the UPS power supply unit only for a short time, for instance, to switch on loads or devices.

Furthermore, the specific maximum short-circuit current is indicated for such UPS power supply units. This is usually 200 to 300% of the rated current for a few milliseconds. If a short circuit occurs during battery operation of the UPS power supply unit in a load branch or load circuit connected to the UPS power supply unit on the output side, the short circuit current is limited by the output power of the UPS power supply unit. This short-circuit current is often not sufficient to trip a conventional circuit breaker, in particular an electromechanical line circuit breaker according to the magnetic principle, therefore, for example, a thermal-magnetic circuit breaker. As a result, the power limit of the UPS power supply unit would be exceeded and consequently the output voltage would break down. However, this would also interrupt the supply of other fault-free load branches or load circuits by turning off the UPS power supply unit for self-protection and thereby switching off its output voltage. The UPS power supply unit cannot selectively shut down only a faulty load branch or load circuit.

Switching on loads is often enough to exceed the power limit of the UPS power supply unit. Therefore, this automatically switches to the network operation (bypass operation). The inrush current is then supported from the AC network and can assume higher values than is possible during converter operation. The output voltage of the UPS power supply unit is now maintained, wherein the current is limited only by an upstream fuse or by protection on the load-branch side, which would trip correspondingly when the respective characteristic curve is exceeded.

If the protection of loads (devices) connected to such a UPS power supply unit were to be realized by line circuit breakers with so-called B or C characteristics (IEC 60898), the protection would typically be directed to the usual installation requirements for line protection in domestic and industrial operation. However, because magnetic tripping of such a line circuit breaker during battery operation can only take place when the short-circuit current of the UPS power supply unit is sufficient for tripping the line circuit breaker, there practically needs to be an overdimensioning of the UPS power supply unit with which the short-circuit current required to trip the circuit breaker can be supplied without turning off the UPS power supply for self-protection before reaching the corresponding current value and switching off its output voltage.

SUMMARY OF THE INVENTION

It is therefore an object of the invention to provide a power distribution system of the aforementioned type which ensures a selective tripping of a circuit breaker connected downstream of the power supply unit on the output side to the uninterruptible power supply (UPS power supply unit) in the event of an overload and/or without using a USP power supply unit overdimensioned in terms of power.

For this purpose, the power distribution system provided for connection to an AC voltage network comprises a power supply unit for an uninterruptible power supply (UPS power supply unit) with a network-side input and with at least one output to which a number of loads are or can be connected in parallel load circuits. A protective device having an electromechanical tripping device, for example, a thermal-magnetic tripping device, and having an evaluation and tripping unit is connected to the or each load circuit. The electronic evaluation and tripping unit, which is integrated into the protective device or is assigned to it in the form of an electronic module, actuates the protective device or trips its tripping device by means of a current-dependent tripping characteristic in the form of an electronic overload and/or short circuit characteristic curve and as a function of the output voltage of the UPS power supply unit. The protective device or its tripping device has suitably the thermal-magnetic properties of a line circuit breaker and/or device circuit breaker with B or C characteristics. According to IEC 60898, the B characteristic is understood to be the standard line protection and the C characteristic, a line protection for higher inrush currents, such as, for example, in machines or lamp groups.

In an embodiment, the evaluation and tripping unit is supplied with the output voltage of the UPS power supply unit, said voltage being detected on the power supply side in the protective device, and with the current, detected in a tripping path between the power supply-side output of the UPS power supply unit and a load output of the protective device. The evaluation and tripping unit can trip the protective device when the detected current exceeds a predetermined current value and the detected output voltage of the UPS power supply unit falls below a predetermined voltage value.

In the event of a power failure, the UPS power supply unit switches to battery operation according to its intended purpose, so that bypass operation is no longer possible. If a higher current is necessary during battery operation than is possible by short-term overloading of the UPS power supply unit, it can still supply a limited short-circuit current for a short time. In this case, however, it is no longer ensured that the output voltage of the UPS power supply unit remains within the limits of safe operation. As a result, additional consumers are perhaps connected to the undervoltage and switch off. If the high current, e.g., due to a short circuit of a connected load in the particular load circuit, continues to flow, the UPS power supply unit would also switch off because of permanent overload.

An exemplary embodiment of the invention is based on the realization that by the combination of an electromechanical, for example, thermal-magnetic, protective device, in particular a line circuit breaker, an overdimensioning of the UPS power supply unit for generating the required short-circuit current or the corresponding current value can be avoided with a current and voltage evaluation by detecting and evaluating not only the actual load current (actual current) through the protective device, but also the output voltage of the UPS power supply unit, which power supply-side output voltage is synonymous with the voltage (actual voltage) at the connected load.

Because a UPS power supply unit contains data on the maximum and short-circuit current as well as on the quality of the voltage maintenance according to the standard, in particular according to the corresponding UPS data sheet, the values therefore directly accessible to a user can be input into the electronic evaluation and tripping unit of the protective device. The value of the maximum current, which is thus specific to the UPS power supply unit, is used to match the detected actual current with a characteristic curve which is dependent on the input of the specific value. This maximum load or maximum current characteristic curve is suitably configured in such a way that its time-current value pairs are smaller or identical to the rated values of the UPS power supply unit during battery operation.

If this set characteristic curve is exceeded by the current flowing through the protection device, i.e., over its tripping path, the protective device is tripped in the affected load circuit (load branch) only if the detected output voltage of the UPS power supply unit of the power distribution system also falls below a voltage limit or a voltage limit value. Such a voltage limit, again defined in DIN EN 62040-3 (Section 5.3.4), can be also supplied to the evaluation and tripping unit of the electromechanical protective device as a voltage limiting value for a maximum load, for the respectively used UPS power supply unit.

Accordingly, each time the programmed characteristic curve, in particular the current characteristic curve, is exceeded, a distinction is made as to whether the UPS power supply unit is in network operation or in battery operation. In this case, a higher current (short-circuit current) can be permitted during network operation, without the protective device being tripped and thus the corresponding load circuit being disconnected. The faulty load branch is disconnected according to the standard in sufficient time so that the voltage supply of the other faulty load branches of the power distribution system is always ensured.

The invention is based on the premise that, when only a conventional or normal line circuit breaker is used in the particular load circuit, an exact protective function for protecting the load cannot be produced practically. In particular for loads with high inrush currents, the use of typical line circuit breakers is possibly unsuitable, because the spread between the rated current and the magnetic trip current in line circuit breakers does not match the current profile of these loads even if such a line circuit breaker with a C characteristic is used.

In an embodiment, the rated current (rated load) of the connected load or the connected device can also be input in addition to the maximum current of the UPS power supply unit. Based on this input into the evaluating and tripping unit of the protective device, an overload characteristic curve is formed whose time-current value pairs are smaller than those of the UPS power supply unit but larger than those of the connected load or of the connected device in normal operation. The characteristic curves of the overload and the maximum load meet in a common point or characteristic curve region. If the resulting characteristic curve is exceeded, the tripping of the protective device initiated by the evaluation and tripping unit takes place immediately, wherein the properties of the line protection of the protective device are always maintained, irrespective of the electronic tripping.

If the UPS power supply unit is operated via its integrated converter, including the connected buffer accumulator (buffer battery), its performance is limited. The protective device with an integrated evaluation and tripping unit includes a line circuit breaker, i.e., in particular a thermal-magnetic tripping device, and additionally has an electronic module as the evaluation and tripping electronics which detects the overload situation of the UPS power supply unit and trips, therefore basically remotely controls, the line circuit breaker, i.e., the thermal-magnetic tripping device. An electronic characteristic curve can be generated by inputting into the evaluation and tripping unit of the protective device two current parameters, namely, a current value (current limit value), for determining the position of the device or line protection characteristic curve and a current value (current limit value) for determining the position of the device or line protection characteristic curve relative to the UPS overload characteristic curve.

The basis for the overload detection of the UPS power supply unit can be a software-implemented algorithm, which essentially monitors the overcurrent situation. Exceeding the electronic characteristic curve in the short-circuit region is only tolerated if the output voltage as well of the UPS power supply unit is still maintained. If both the overcurrent has exceeded the maximum current of the UPS power supply unit during battery operation and, therefore, the output voltage of the UPS power supply unit also no longer corresponds to the proper operation, the circuit breaker is tripped.

If the UPS power supply unit is still supplied by the AC voltage network, a higher current can be drawn for turning on via the bypass. The protective device will not trip in this case, because the tripping event according to the algorithm has not occurred. In the event of a short circuit, the integrated electromechanical tripping device of the protective device can trip normally.

If, in contrast, the AC voltage network has failed, a current, which comes up to the overload limits of the UPS power supply unit, flows in this case due to the turning-on of the load or due to a short circuit in the corresponding load circuit. This affects the output voltage of the UPS power supply unit, so that consequently there is a tripping event according to the algorithm and the disconnection (tripping) occurs by the circuit breaker.

The effective value of the load current can also be calculated within selected time intervals and a check can be made as to whether the effective value of the current exceeds the overload characteristic curve. If the load current exceeds the characteristic curve of one of the intervals, the circuit breaker is tripped.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
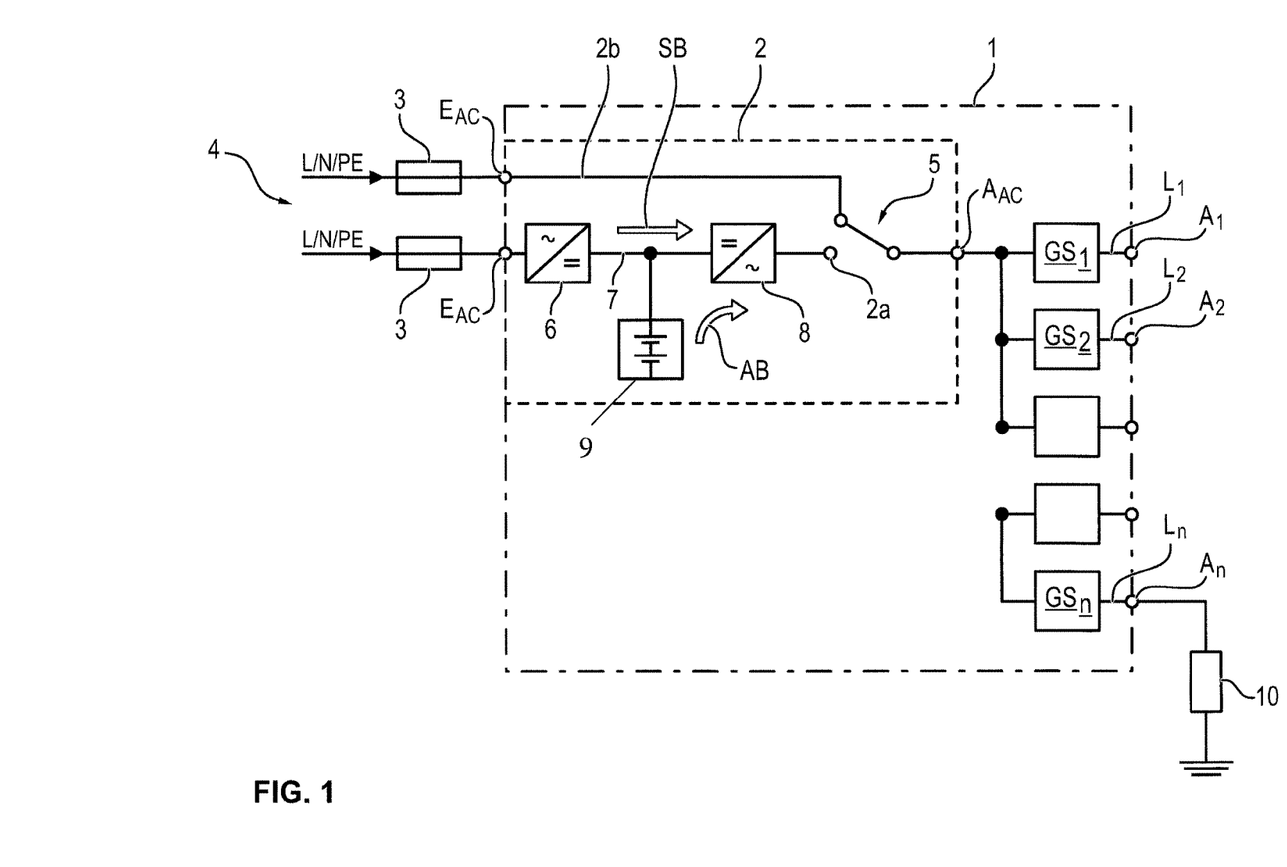
FIG. 1 schematically shows a power distribution system connected to an AC voltage network with a number of load circuits, supplied without interruption by a UPS power supply unit, in each case with an electromechanical circuit breaker for protection against overload and short circuit.

FIG. 1 schematically shows a power distribution system 1 with an uninterruptible power supply, which is referred to hereinafter as UPS power supply unit 2 and which is connected to an AC voltage network (L, N, PE) 4 via AC voltage inputs $E_{AC}$ and fuses 3 arranged upstream in the exemplary embodiment. UPS power supply unit 2 has a converter path 2a and a bypass path 2b. A switching device 5, for example, in the form of a contactor or switching electronics, enables switching between converter path 2a and bypass path 2b as well as its connection to a load-side AC voltage output $A_{AC}$ of UPS power supply unit 2.

Converter path 2a of UPS power supply unit 2 is substantially formed by a network-side AC-DC converter (rectifier) 6 and a DC intermediate circuit 7 downstream thereof, as well as a DC-AC inverter 8. A battery or accumulator 9 is connected to DC intermediate circuit 7. The converter operation of UPS power supply unit 2 is symbolized by the arrow marked SB, whereas the battery operation of UPS power supply unit 2, which is also referred to as autonomous operation, is symbolized by the arrow marked AB.

A number of load circuits $L_m$ with m=1, 2, . . . , n, parallel to one another, are connected to the AC output $A_{AC}$ of UPS power supply unit 2. In the exemplary embodiment, an electromechanical protective device $GS_m$ with m=1, 2, . . . , n, in particular a thermomagnetic line circuit breaker with B characteristics, is connected in each load circuit $L_m$. In the or each load circuit $L_m$, there is a load 10, which is connected to the respective protective device $GS_m$ via a corresponding output $A_m$ of power distribution system 1. Load 10 represents, for example, a device supplied by power distribution system 1.

Figure 2:
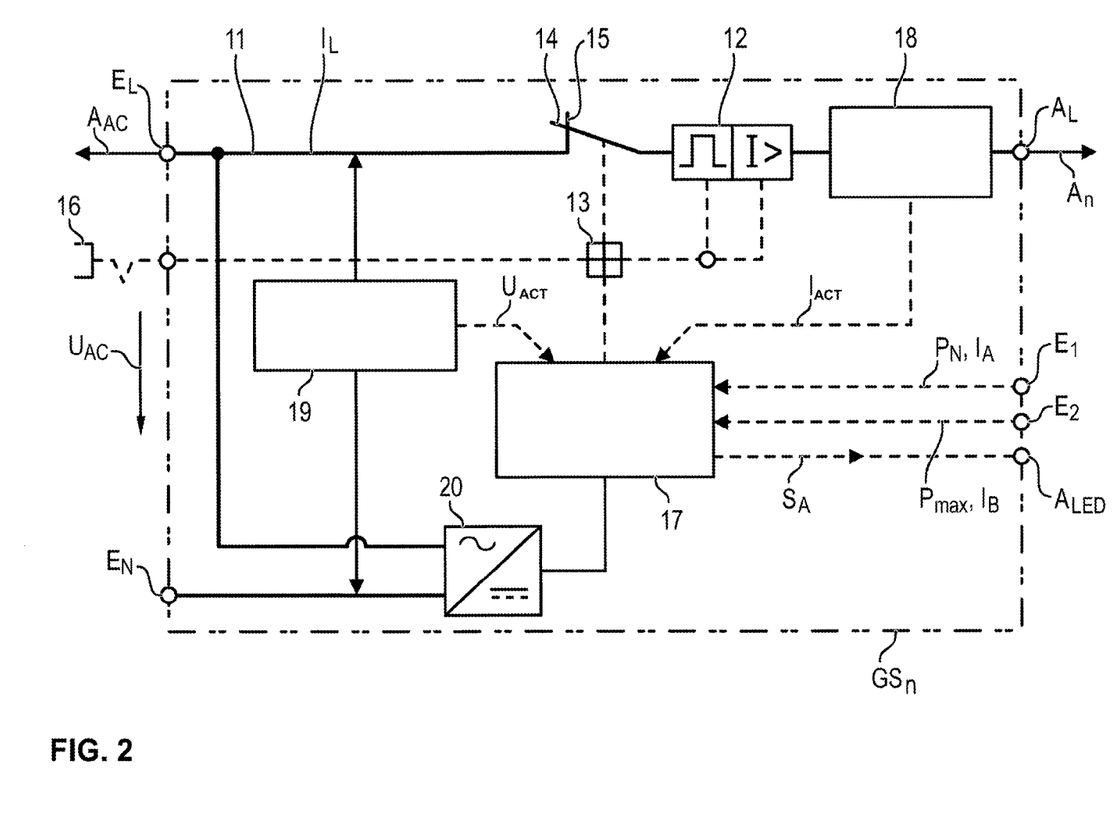
FIG. 2 schematically shows the circuit breaker with a thermal-magnetic tripping device as well as with an evaluation and tripping unit (electronics) and with current and voltage measurement.

FIG. 2 shows the structure or functional components of the respective electromechanical protective device $GS_m$. A thermal-magnetic tripping device 12 and switch contacts 14, 15 actuated by the device via a switch latch 13 are connected in a tripping path 11 between the LINE input $E_L$, connected to the AC voltage output $A_{AC}$, and an output $A_L$ of protective device $GS_m$, output $A_L$ being connected to the load output $A_n$ of power distribution system 1 or forming it. Switch latch 13 can, for example, also be manually actuated from the outside by means of a pushbutton or switch lever 16, therefore, for example, switched on or tripped (ON/OFF). Tripping device 12, switch latch 13, and switch contacts 14, 15 form as it were the electromechanical line or device circuit breaker of protective device $GS_m$.

Protective device $GS_m$ has an electronic evaluation and tripping unit 17, which is referred to hereafter as switch electronics or simply as electronics and which is integrated into protective device $GS_m$ or assigned to the device as an electronic module, for example, also in a separate module housing. Electronics 17 is supplied with load current $I_L$, as the actual current $I_{act}$, flowing over tripping path 11 of protective device $GS_m$ and measured by a current sensor 18. The current measurement can occur contact-free and in particular inductively. In addition, electronics 17 is supplied with output voltage $U_{AC}$ of UPS power supply unit 2 as the actual voltage $U_{act}$, the output voltage being detected between input $E_L$ and a further input $E_N$ of protective device $GS_m$ by means of a voltage measuring device 19.

The voltage supply to electronics 17 is effected by means of a power supply unit 20 in the form of an AC-DC converter (rectifier), which is connected to inputs $E_L$ and $E_N$ on the AC voltage side as well as to electronics 17 on the DC voltage side. Electronics 17 is also supplied in addition via inputs $E_1$ and $E_2$ with a load-specific or device-specific parameter $P_N$, which indicates its rated load, and a parameter $P_{max}$, characterizing the maximum load of UPS power supply unit 2, by the corresponding parameter input. Direct current parameters $I_A$ or $I_B$ can also be input into electronics 17.

Figure 4:
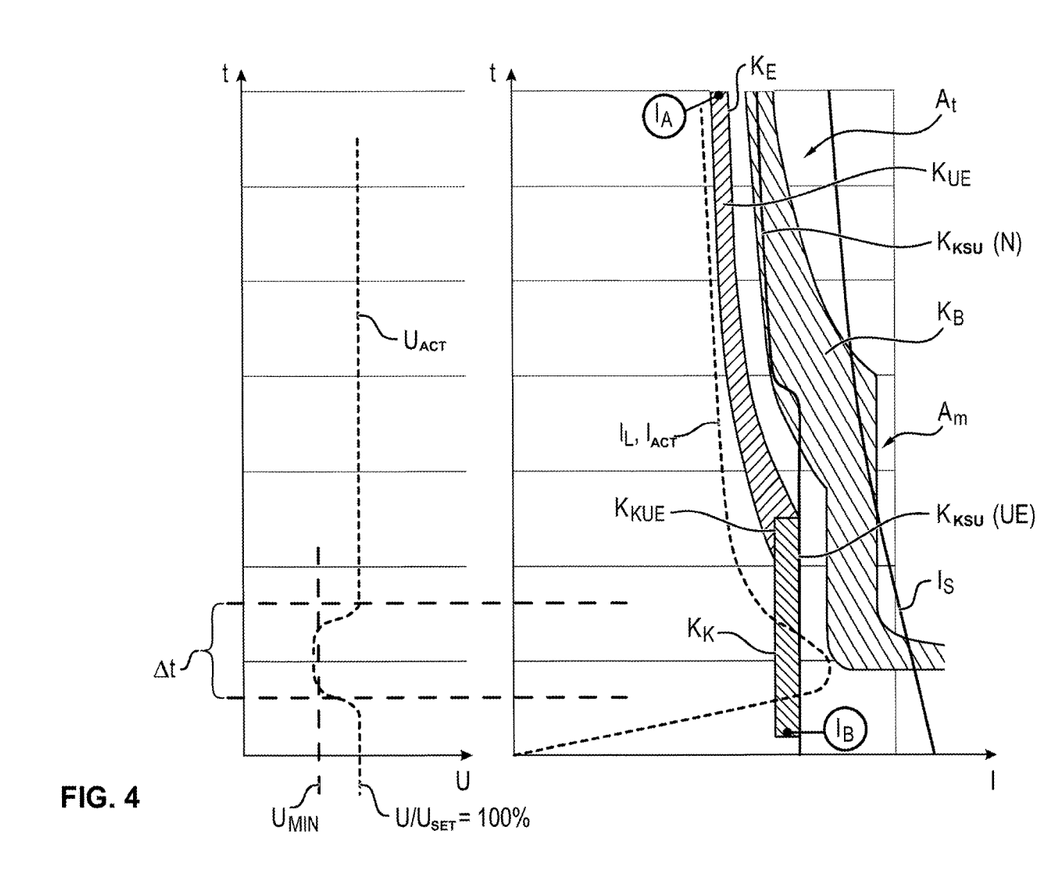
FIG. 4 shows the electronic and B-characteristic curve profile of the circuit breaker during battery operation of the UPS power supply unit.

The current value $I_A$, resulting from the input of parameter $P_N$ or inputted directly, determines the position of an electronic overload characteristic curve $K_{UE}$ shown in FIG. 4 or a corresponding characteristic curve region of protective device $GS_m$, whereas the input of the power supply-specific parameter $P_{max}$ or $I_B$ determines the position of an electronic short-circuit characteristic curve $K_K$ or a corresponding characteristic curve region for the UPS protection of UPS power supply 2. The characteristic curve regions $K_{UE}$ and $K_K$ form the electronic characteristic curve $K_E$, shown in FIG. 4, or the corresponding characteristic curve region of the protective device $GS_m$. The presetting using parameter $P_{max}$ or $I_B$ is suitably done using the data sheet for UPS power supply unit 2 with respect to the short-circuit current.

In the exemplary embodiment, electronics 17 supplies an indicator signal $S_A$ to an output $A_{LED}$ of the circuit breaker for controlling, for example, a luminous display (LED) or the like.

Figure 3:
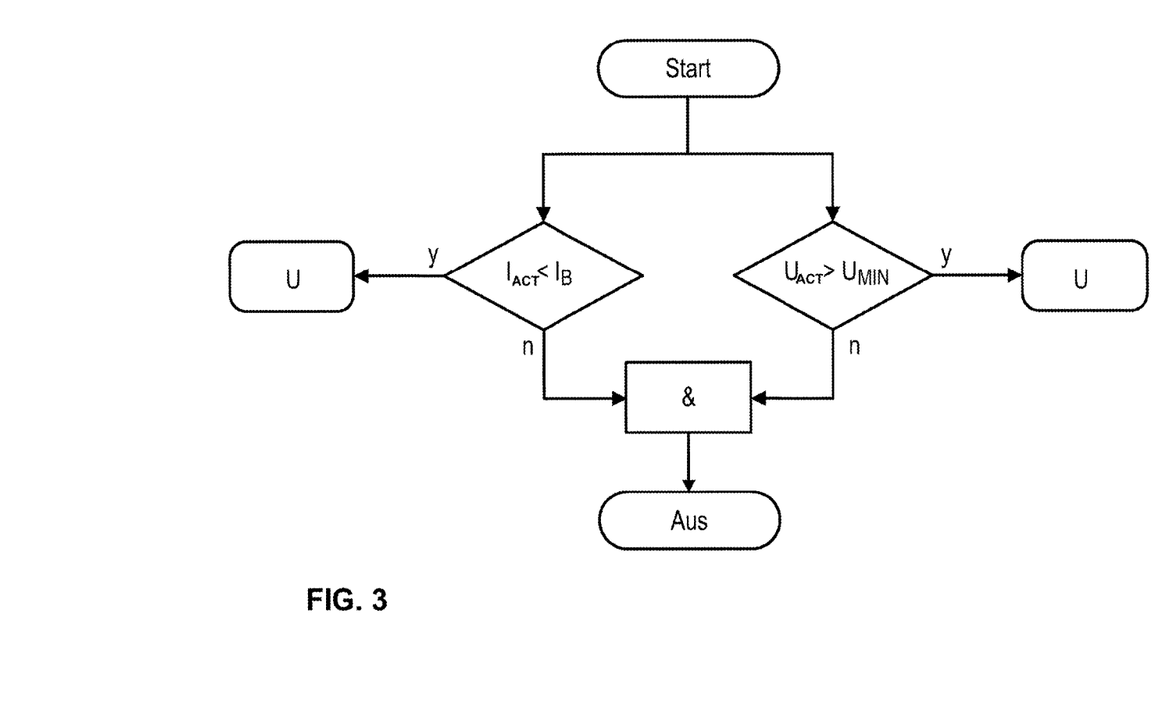
FIG. 3 schematically shows an algorithm for determining a tripping event as implemented in the evaluation and tripping unit.

FIG. 3, in conjunction with the diagrams in FIG. 4, illustrates the tripping algorithm of protective device $GS_m$, which has been implemented as software in electronics 17. FIG. 4 in the right half of the figure shows in a time-current diagram the course of the actual current $I_{act}$ which is typical for the switch-on characteristic curve of load 10. Between a power unit-specific rated and overload characteristic curve $K_{UPS}$, typical for UPS power supply 2, with a rated and overload region $K_{KSU}$ (N) or $K_{KSU}$ (UE), and the course of actual current $I_{act}$, an electronic characteristic curve $K_K$ of electronics 17 as a short-circuit region and an electronic characteristic curve $K_{UE}$ of electronics 17 as an overload region are each shown as dashed areas. The characteristic curve region $K_B$ with its thermal overload trip region $A_t$ and its magnetic short-circuit trip region $A_m$ illustrates the B-tripping characteristic of tripping device 12 of protective device $GS_m$ as line and/or device protection. The characteristic curve designated with $I_s$ represents the melting current of fuses 3 connected upstream of UPS power supply unit 2. The electronic characteristic curve $K_{UE}$ for the overload and the electronic characteristic curve $K_K$ of evaluation and tripping unit 17 of protective device $GS_m$, the latter characteristic curve representing the maximum load $P_{max}$, $I_B$ of UPS power supply 2 in the event of a short circuit, meet in the point designated by $K_{KUE}$ or the characteristic curve region or transitional region.

With the beginning (start) of the test cycle of the algorithm illustrated in FIG. 3, a comparison of the detected actual current $I_{act}$ and the current parameter $I_B$ giving the position of the UPS protection characteristic curve $K_{UPS}$ or the electronic characteristic curves $K_K$ for the short circuit region is made in or by electronics 17 on the basis of the implemented algorithm. In addition, a comparison can occur of the time profile of the actual voltage $U_{act}$ of the detected output voltage $U_{AC}$ of UPS power supply unit 2 with a voltage value $U_{MIN}$ derived from the parameter $P_{max}$ for the maximum load of UPS power supply unit 2 ($U_{MIN}=P_{Max}/I_B$). $U_{MIN}$ can also be obtained from the DIN EN 62040-3 standard for the uninterruptible power supply and/or from the data sheet of UPS power supply unit 2.

If during a time interval $\Delta t$, illustrated in FIG. 4, for a maximum duration $\Delta t \geq t_{max}$, with, for example $t_{max}=1$ ms, the detected actual current $I_{act}$ exceeds the characteristic curve region $K_K$, $K_{UPS}$, predetermined by the current parameter or current value $I_B$, and hereby the detected actual voltage $U_{act}$ and thereby the output voltage $U_{AC}$ of UPS power supply unit 2 fall below the predetermined voltage or minimum value $U_{MIN}$, protective device $GS_m$ is tripped by a corresponding opening of switch contacts 14, 15 as a result of a corresponding tripping (off) of tripping device 12, directly or indirectly, via switch latch 13, on the basis of a corresponding initiation by electronics 17. Otherwise, an uncritical operation designated by U is detected.

FIG. 4 shows the voltage-time curve of the detected actual value $U_{act}$ of the output voltage $U_{AC}$ in the left half of the figure as the characteristic curve of UPS power supply unit 2 in battery operation AB. During converter operation SB, or in the case of an optional changeover to bypass path 2b of UPS power supply unit 2, no voltage drop in the output voltage $U_{AC}$ of UPS power supply unit 2 would be expected during the time interval $\Delta t$ and thus no falling of the actual voltage $U_{act}$ below the minimum or threshold value $U_{MIN}$. The specified value $U/U_{set}=100\%$ without a voltage drop in the time interval $\Delta t$ represents the corresponding characteristic curve for converter operation or bypass operation.

The invention is not limited to the exemplary embodiments described above. Rather, other variants of the invention can also be derived herefrom by the skilled artisan, without going beyond the subject of the invention. Particularly, further all individual features described in relation to the exemplary embodiments can also be combined with one another in a different manner, without going beyond the subject of the invention. Thus, for example, the number of connected load circuits of power distribution system 1 can also be one (1).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A power distribution system for connection to an AC voltage network, the system comprising:
   a UPS power supply unit for uninterruptible power supply with a network-side input;
   at least one output to which a number of loads are connectable in parallel load circuits;
   a protective device having an electromechanical tripping device or a thermal/magnetic tripping device and having an evaluation and tripping unit connected in at least one of the parallel load circuits, the evaluation and tripping unit actuating the electromechanical tripping device or the thermal/magnetic tripping device and tripping the protective device based on an electronic overload and/or short-circuit characteristic curve and based on an output voltage from the UPS power supply unit; and
   a converter, connected between the UPS power supply unit and the evaluation and tripping unit, configured to convert the output voltage of the UPS power supply unit and to supply a converted voltage to the evaluation and tripping unit.

2. The power distribution system according to claim 1, wherein the evaluation and tripping unit is supplied with the output voltage of the UPS power supply unit, the output voltage being detected on a power supply side or in the protective device, and
   wherein a current is detected in a tripping path between a power supply-side output and a load output of the protective device.

3. The power distribution system according to claim 2, wherein the evaluation and tripping unit trips the protective device when a detected current exceeds a predetermined current value and a detected output voltage of the UPS power supply unit falls below a predetermined voltage value.

4. The power distribution system according to claim 1, wherein the protective device has an input for inputting a parameter representing a maximum load of the UPS power supply unit into the evaluation and tripping unit, and wherein the parameter is used for matching a detected actual current with an overload characteristic curve of the UPS power supply unit, the overload characteristic curve being dependent on the parameter.

5. The power distribution system according to claim 1, wherein the protective device has an input for inputting a parameter representing a rated load of a connected load into the evaluation and tripping unit.

6. The power distribution system according to claim 4, wherein the evaluation and tripping unit based on an entered parameter and/or an entered parameter forming an electronic characteristic curve of an overload region or a short-circuit region, and
wherein the time-current value pairs of which are smaller than those of the overload characteristic curve of the UPS power supply unit but larger than those of a connected load or of a connected device in normal or rated load operation.

7. The power distribution system according to claim 1, wherein tripping of the protective device in an affected load circuit only occurs when, in a case when an overload characteristic curve of the UPS power supply unit is exceeded by a detected actual current, a detected output voltage of the power supply unit falls below a voltage limiting value.

8. The power distribution system according to claim 1, wherein an electronic characteristic curve for an overload and an electronic characteristic curve of the evaluation and tripping unit of the protective device, and
wherein the electronic characteristic curve representing a maximum load of the UPS power supply unit, in an event a short circuit, meet in a characteristic curve region.

9. The power distribution system according to claim 8, wherein, if the electronic characteristic curve for the overload and/or the electronic characteristic curve in the event of the short circuit are exceeded, the protective device is tripped by the evaluation and tripping unit.

10. The power distribution system according to claim 1, wherein electronic characteristic curves of the evaluation and tripping unit represent a maximum possible load current during a converter operation of the UPS power supply unit, at which the output voltage thereof does not fall below a defined limit value.

11. The power distribution system according to claim 1, wherein the converter is an AC-DC converter.

12. The power distribution system according to claim 1, wherein the current sensor is connected between the electromechanical tripping device or the thermal/magnetic tripping device and the parallel load circuits.

13. The power distribution system according to claim 1, wherein the UPS power supply unit comprises:
a rectifier;
a DC-AC inverter connected to the rectifier; and
an accumulator connected between the rectifier and the DC-AC inverter.

14. The power distribution system according to claim 1, wherein the protective device comprises a switch latch configured to actuate the electromechanical tripping device or the thermal/magnetic tripping device.

15. The power distribution system according to claim 1, wherein the protective device comprises a lever switch configured to manually actuate the electromechanical tripping device or the thermal/magnetic tripping device.

16. The power distribution system according to claim 1, wherein the evaluation and tripping unit is configured to supply an indicator signal to control a luminous display.

17. The power distribution system according to claim 1, wherein the protective device comprises a voltage measuring device connected between the electromechanical device or the thermal/magnetic tripping device and the converter.

18. A method for selectively tripping a protective device connected to a UPS power supply unit, the method comprising:
providing the UPS power supply unit for uninterruptible power supply with a network-side input;
providing the protective device having at least one output to which a number of loads that are connectable in parallel load circuits;
providing the protective device having an electromechanical tripping device or a thermal/magnetic tripping device;
providing an evaluation and tripping unit connected in at least one of the parallel load circuits,
providing a converter connected between the UPS power supply unit and the evaluation and tripping unit,
actuating, by the evaluation and tripping unit, the electromechanical tripping device or the thermal/magnetic tripping device;
converting, by the converter, the output voltage of the UPS power supply unit;
supplying, by the converter, a converted voltage to the evaluation and tripping unit; and
tripping, by the evaluation and tripping unit, the protective device based on an electronic overload or a short-circuit characteristic curve and based on the output voltage of the UPS power supply unit.

19. A protective device, comprising:
a tripping device;
an evaluation and tripping unit configured to actuate the tripping device; and
a converter, connected between a UPS power supply unit of a power system and the evaluation and tripping unit, configured to convert an output voltage of the UPS power supply unit and supply a converted voltage to the evaluation and tripping unit,
wherein the evaluation and tripping unit is configured to trip the protective device based on an electronic overload or a short-circuit characteristic curve and based on the output voltage from the UPS power supply unit.

* * * * *